United States Patent
Elyashev et al.

(10) Patent No.: US 9,329,947 B2
(45) Date of Patent: May 3, 2016

(54) RESUMING A PAUSED VIRTUAL MACHINE WITHOUT RESTARTING THE VIRTUAL MACHINE

(75) Inventors: Vitaly Elyashev, Ramat Gan (IL); Amos Benari, Yokneam Hamoshava (IL)

(73) Assignee: Red Hat Israel, Ltd., Raanana (IL)

( * ) Notice: Subject to any disclaimer, the term of this patent is extended or adjusted under 35 U.S.C. 154(b) by 404 days.

(21) Appl. No.: 12/821,066

(22) Filed: Jun. 22, 2010

(65) Prior Publication Data
US 2011/0314470 A1    Dec. 22, 2011

(51) Int. Cl.
*G06F 9/455* (2006.01)
*G06F 11/14* (2006.01)
*G06F 11/20* (2006.01)

(52) U.S. Cl.
CPC .......... *G06F 11/1484* (2013.01); *G06F 11/203* (2013.01); *G06F 2009/45575* (2013.01)

(58) Field of Classification Search
USPC .......................................... 711/6; 718/1, 100
See application file for complete search history.

(56) References Cited

U.S. PATENT DOCUMENTS

| | | | |
|---|---|---|---|
| 7,533,229 B1 * | 5/2009 | van Rietschote | 711/161 |
| 7,797,587 B2 * | 9/2010 | Vasudevan et al. | 714/47.1 |
| 7,877,485 B2 * | 1/2011 | Piper et al. | 709/227 |
| 8,156,491 B2 * | 4/2012 | Dake | 718/1 |
| 2006/0143517 A1 * | 6/2006 | Douceur et al. | 714/21 |
| 2008/0098309 A1 * | 4/2008 | Fries et al. | 715/734 |
| 2008/0201711 A1 | 8/2008 | Amir Husain | |
| 2010/0037089 A1 * | 2/2010 | Krishnan et al. | 714/5 |
| 2011/0029970 A1 * | 2/2011 | Arasaratnam | 718/1 |
| 2011/0202728 A1 * | 8/2011 | Nichols et al. | 711/141 |

OTHER PUBLICATIONS

"Solid Ice™ Provisioning Manager", Apr. 2008, pp. 1-5, Qumranet, Inc.
"Solid Ice™ Overview", Apr. 2008, pp. 1-15, Qumranet, Inc.
Red Hat, Inc., "Red Hat Enterprise Virtualization Manager for Servers", 2009, 4 pages.
Red Hat, Inc., "Red Hat Enterprise Virtualization Manager for Servers, Delivering on the Promises of Desktop Virtualization", 2009, 14 pages.

* cited by examiner

*Primary Examiner* — Tuan Dao
*Assistant Examiner* — William C Wood
(74) *Attorney, Agent, or Firm* — Lowenstein Sandler LLP

(57) ABSTRACT

A computing device executing a virtualization manager detects that a virtual machine running on a host has been paused. While the virtual machine is paused, no processor cycles are assigned to the virtual machine. The computing device determines whether a condition that caused the virtual machine to be paused has been resolved. If the condition has been resolved, the computing device causes the virtual machine to be resumed. Resuming the virtual machine includes assigning processor cycles to the virtual machine and performing a last input/output operation that was attempted prior to the virtual machine being paused.

18 Claims, 6 Drawing Sheets

RESUMING A PAUSED VIRTUAL MACHINE WITHOUT RESTARTING THE VIRTUAL MACHINE

TECHNICAL FIELD

Embodiments of the present invention relate to monitoring virtual machines, and more specifically to identifying paused virtual machines and automatically resuming paused virtual machines.

BACKGROUND

A host machine (e.g., computer or server) may host multiple virtual machines, each of which includes its own guest software. The host machine is typically connected to some type of storage domain for writing data to and reading data from. Occasionally, a data store (e.g., a storage device or an entire storage domain) may become unreachable by a host machine. When this occurs, some host machines pause the virtual machines that they host to prevent corruption of the virtual machines. However, once a virtual machine has been paused, an administrator must manually determine that access to the data store has been reopened, and manually resume the paused virtual machines.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
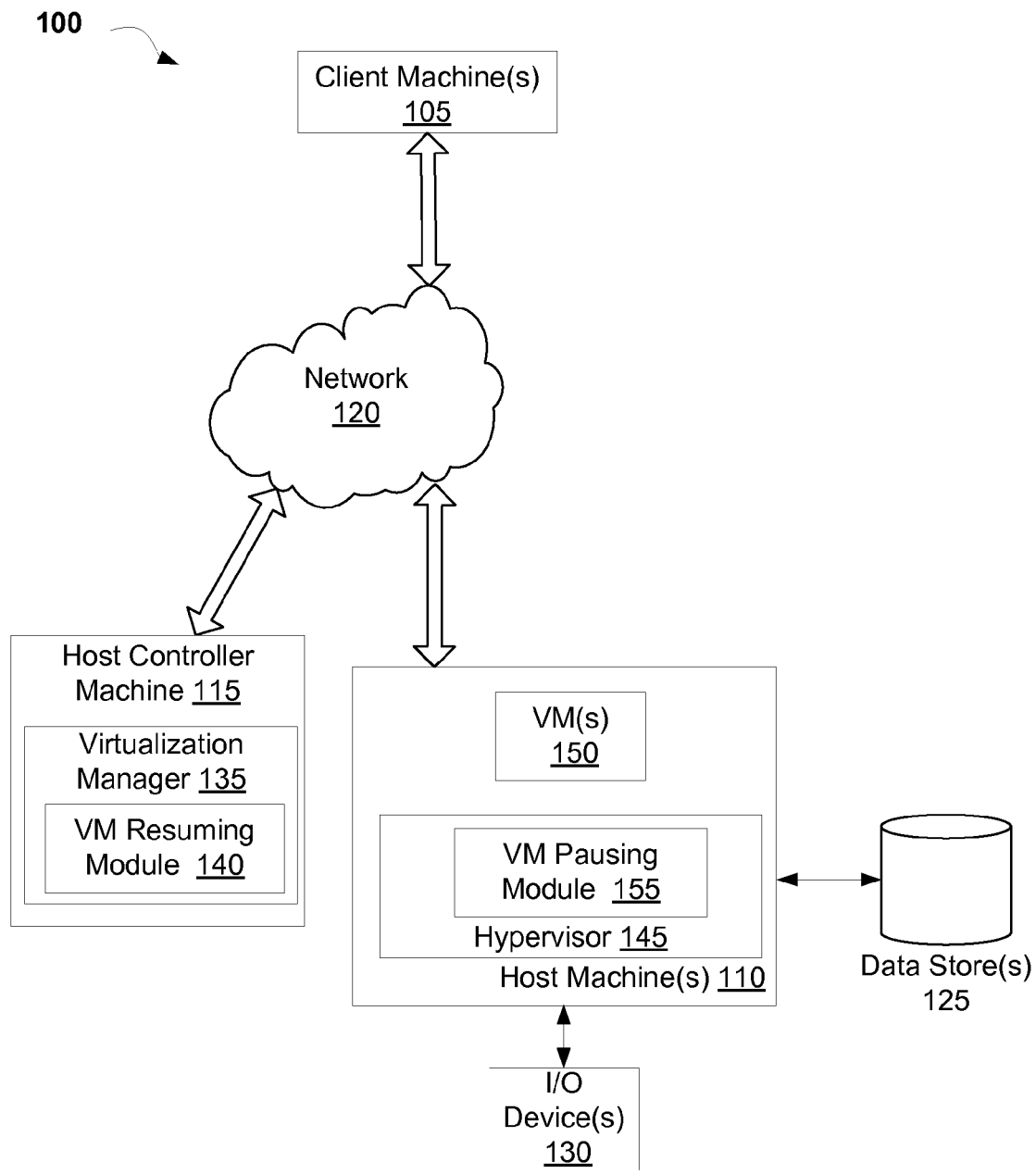
FIG. 1 is a block diagram of a network architecture, in which embodiments of the invention may operate.

Embodiments of the invention provide a mechanism for automatically resuming paused virtual machines (VMs). In one embodiment, a computing device executing a virtualization manager detects that a virtual machine (VM) running on a host has been paused. While the VM is paused, no processor cycles are assigned to the virtual machine. The computing device determines whether a condition that caused the virtual machine to be paused has been resolved. This may be determined by monitoring the host, including storage connections of the host. If the condition has been resolved, the computing device causes the virtual machine to be resumed. In one embodiment, the virtualization manger sends a resume command to the host to cause the virtual machine to be resumed. Resuming the virtual machine includes assigning processor cycles to the virtual machine and performing the last input/output operation that was attempted prior to the virtual machine being paused.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting", "determining", "identifying", "causing", "migrating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine readable storage medium such as a read only memory ("ROM"), random access memory ("RAM"), magnetic disk storage media, optical storage media, flash memory devices, etc.

FIG. 1 is a block diagram of a network architecture 100, in which embodiments of the invention may operate. The network architecture 100 includes, but is not limited to, one or more client machines (clients) 105 communicatively coupled to one or more host machines (hosts) 140 or a cluster of hosts 110 over a network 120. The network architecture 100 may also include the clients 105 connected with a host controller machine (host controller) 145 over the network 120. Network 120 may be a private network (e.g., a local area network (LAN), a wide area network (WAN), etc.) or a public network (e.g., the Internet), and may be a combination of one or more networks. Note that the host machines, host controller machine and/or client machines may be physical hardware machines (e.g., desktop computers, server computers, etc.) or virtual machines. One or more of the host machines, host controller machine and/or client machines may be hosted by the same physical hardware machine if these machines are virtual machines.

Each host 110 is a server configured to host one or more services, applications or other processes. One or more hosts 110 may host virtual machines (VM) 150. The host 110 may include a bare platform hardware that may be a personal computer (PC), server computer, mainframe, or other computing system. The platform hardware can include a processor, memory, input/output devices, etc. Alternatively, the host 110 may be a virtual machine.

The host 110 may include a hypervisor 145 (also known as a virtual machine monitor (VMM)). The hypervisor 145, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc.

In one embodiment, the hypervisor 145 is run directly on bare platform hardware. In another embodiment, the hypervisor 145 is run on top of a host OS. Alternatively, for example, the hypervisor 145 may be run within, or on top of, another hypervisor. Hypervisors may be implemented, for example, in hardware, software, firmware or by a combination of various techniques.

The hypervisor 145 presents to other software (i.e., "guest" software) the abstraction of one or more virtual machines (VMs) 150, which may provide the same or different abstractions to various guest software (e.g., guest operating system, guest applications, etc.). A virtual machine 150 is a combination of guest software that uses an underlying emulation of a hardware machine (e.g., as provided by hypervisor 145). Virtual machines 150 can be, for example, hardware emulation, full virtualization, para-virtualization, and operating system-level virtualization virtual machines. Each virtual machine 150 includes a guest operating system (guest OS) that hosts one or more applications within the virtual machine. The guest OSes running on the virtual machines 150 can be of the same or different types (e.g., both may be Windows operating systems, or one may be a Windows operating system and the other a Linux operating system). Moreover, the guest OSes and the host OS may share the same operating system type, or the host OS may be a different type of OS than one or more guest OSes. For example, a guest OS may be a Windows operating system from Microsoft® and a host OS may be a Linux operating system available from Red Hat®.

In one embodiment, each virtual machine 150 hosts or maintains a desktop environment providing virtual desktops for remote clients (e.g., client 105) and/or local users (e.g., via input/output devices 130). A virtual desktop is a virtualized desktop computer, and thus includes storage, an operating system, applications installed on the operating system (e.g., word processing applications, spreadsheet applications, email applications, etc), and so on. However, rather than these functions being provided and performed at the client 105, they are instead provided and performed by a virtual machine 150. In other embodiments, virtual machines 150 are not virtual desktops. For example, VMs 150 may be virtual servers.

In one embodiment, users access virtual machines 150 remotely via clients 105. In another embodiment, users access virtual machines 115 via input/output (I/O) devices 130 that are connected directly to host or cluster of hosts 110. The I/O devices 130 include devices that enable a user to interact with one or more virtual machines 150. The I/O devices 130 may include, for example, a display, a keyboard, a mouse, a microphone, a usb port, a firewire port, and so on.

Each client machine 105 may be a personal computer (PC), palm-sized computing device, personal digital assistant (PDA), etc. Clients 105 may be fat clients (clients that perform local processing and data storage), thin clients (clients that perform minimal or no local processing and minimal to no data storage), and/or hybrid clients (clients that perform local processing but little to no data storage). In one embodiment, clients 105 essentially act as input/output devices, in which a user can view a desktop environment provided by a virtual machine (e.g., a running instance of an operating system including storage available to the operating system and programs installed and/or running on the operating system) on a monitor, and interact with the desktop environment via a keyboard, mouse, microphone, etc. In one embodiment, a majority of the processing is not performed at the clients 105, and is instead performed by virtual machines 150 hosted by the host 110.

Each VM 150 may communicate with one or more clients 105, one or more applications running on those clients 105, and/or one or more I/O devices 130. Additionally, a single client 105 and/or I/O device 130 may communicate with multiple virtual machines 150. For example, each application running on a client 105 may communicate with different VMs. Alternatively, all of the applications of a client 105 may communicate with a single VM. In one embodiment, there is a one to one correspondence between VMs 150 and clients 105 or I/O devices 130. In one embodiment, VMs 150 communicate with clients 105 and/or client applications using a multichannel protocol (e.g., Remote Desktop Protocol (RDP), Simple Protocol for Independent Computing Environments (SPICE™) from Red Hat, etc.).

The host or hosts 110 are connected to one or more data stores 125. Each data store 125 may be a single storage device, or a storage domain that includes one or more storage devices and/or a storage server for managing the storage devices. The data store 125 may be a storage area network (SAN), a network attached storage (NAS), or a combination thereof. Any changes that are made to services, applications, processes, etc. running on the host 110 (e.g., changes made to a state of a virtual machine 150 during active sessions for the virtual machine) can be stored in the data store 125. Changes made to the state of a virtual machine 150 may include, for example, modification to files within the virtual machine, installation of new programs to a guest OS in the virtual machine, receipt of new email at an email client within the virtual machine, etc. Accordingly, in one embodiment clients 105 need little or no local storage.

In one embodiment, hypervisor 145 includes a virtual machine pausing module 155. When a problem occurs that may cause a VM to become corrupted, VM pausing module 155 pauses the VM to prevent any damage to that VM. For example, when the host 110 loses connection to data store 125, VM pausing module 155 may pause VMs 150. In one embodiment, the VM 150 notifies the hypervisor 145 that a problem has occurred. This notification may prompt the hypervisor to pause the VM. For example, VM 150 may notify hypervisor 145 when the VM 150 fails to perform an input/output (I/O) operation, such as writing data to data store 125 or reading data from data store 125. Alternatively, hypervisor 145 may detect that a problem has occurred without receiving a notification from a VM 150. When the VM 150 fails to successfully perform an I/O operation, the VM may save that last I/O operation (or last few I/O operations). Alternatively, the hypervisor 145 may save the last I/O operation(s) when it pauses the VM 150. The last I/O operation(s) can later be reattempted when the VM is resumed.

The host 110 may be coupled to a host controller machine 115 (via network 120 as shown or directly). In one embodiment, in which the host controller machine (host controller) 115 is directly connected to the host 110, host controller 115 is not connected to clients 105 via network 120. The host controller 115 may monitor and control one or more functions of hosts 110.

In one embodiment, the host controller 115 includes a virtualization manager 135 that manages virtual machines 150. Virtualization manager 135 may be configured to add a virtual machine, delete a virtual machine, balance the load on the host cluster, provide directory service to the virtual machines, resume virtual machines, and/or perform other management functions.

In one embodiment, the virtualization manager 135 monitors each of the hosts 110 to determine whether they have access to the one or more data stores 125 and to determine whether any of the virtual machines 150 have been paused. Virtualization manager 135 includes a virtual machine resuming module 140. If any VMs 150 have been paused on the host 110, the VM resuming module 140 attempts to determine why the VM was paused. In some instances, the hypervisor 145 may report both the paused state of a VM 150 and a reason the VM was paused (e.g., a condition that caused the VM to be paused). In other instances, the hypervisor may report only that a VM was paused without identifying a problem that caused the VM to be paused.

The VM resuming module 140 may deduce a problem that caused the VM to be paused based on how many VMs have been paused, whether VMs from multiple hosts have been paused, when the VMs were paused, network traffic at the time the VM was paused, whether the host machine has access to data store 125, and/or additional information. For example, if the host machine 110 lost access to data store 125, VM resuming module 140 may determine that the VM was paused due to the lost connection between the data store 125 and host 110. The VM resuming module 140 may then determine whether other hosts have access to the data store 125. This information may be used to determine whether there is a full network failure, partial network failure, data store failure, host failure, or other problem.

If, on the other hand, a few VMs on the host 110 were paused while others were not, and no connection failure between the data store 125 and host 110 was reported, it may be determined that the VM was paused due to insufficient allotted storage space. For example, each VM 150 has an allocated amount of dedicated storage space on a data store. The VM can run out of available storage space. When this occurs, the VM requests an extension of storage space. However, if network traffic is high or the data store is busy when the VM requests the extension, the request may time out and the extension may not be granted. This may cause that VM to have an I/O failure or full disk error while other VMs running on the same host have no errors. In this case, the hypervisor 145 may pause the VM even though no problems were detected.

VM resuming module 140 can detect when a problem that caused one or more VMs to be paused has been resolved. For example, when virtualization manager 135 identifies that a connection between host 110 and data store 125 has been restored, VM resuming module 140 may have access to this information. Virtualization manager 135 may identify that a connection between host 110 and data store 125 has been restored, for example, by periodically polling the host 110 for connection status updates (including a status of the connection to data store 125). When VM resuming module determines that a problem that caused a VM to be paused has been resolved, VM resuming module 140 directs the hypervisor 145 to resume the paused VM. Resuming the paused VM includes assigning processor cycles to the VM 150. Additionally, hypervisor 145 may have saved a last input/output (I/O) operation that the VM 150 attempted to perform (or a last few I/O operations that VM attempted to perform). Resuming the VM 150 may further include performing the one or more saved I/O operations by the VM.

Figure 2:
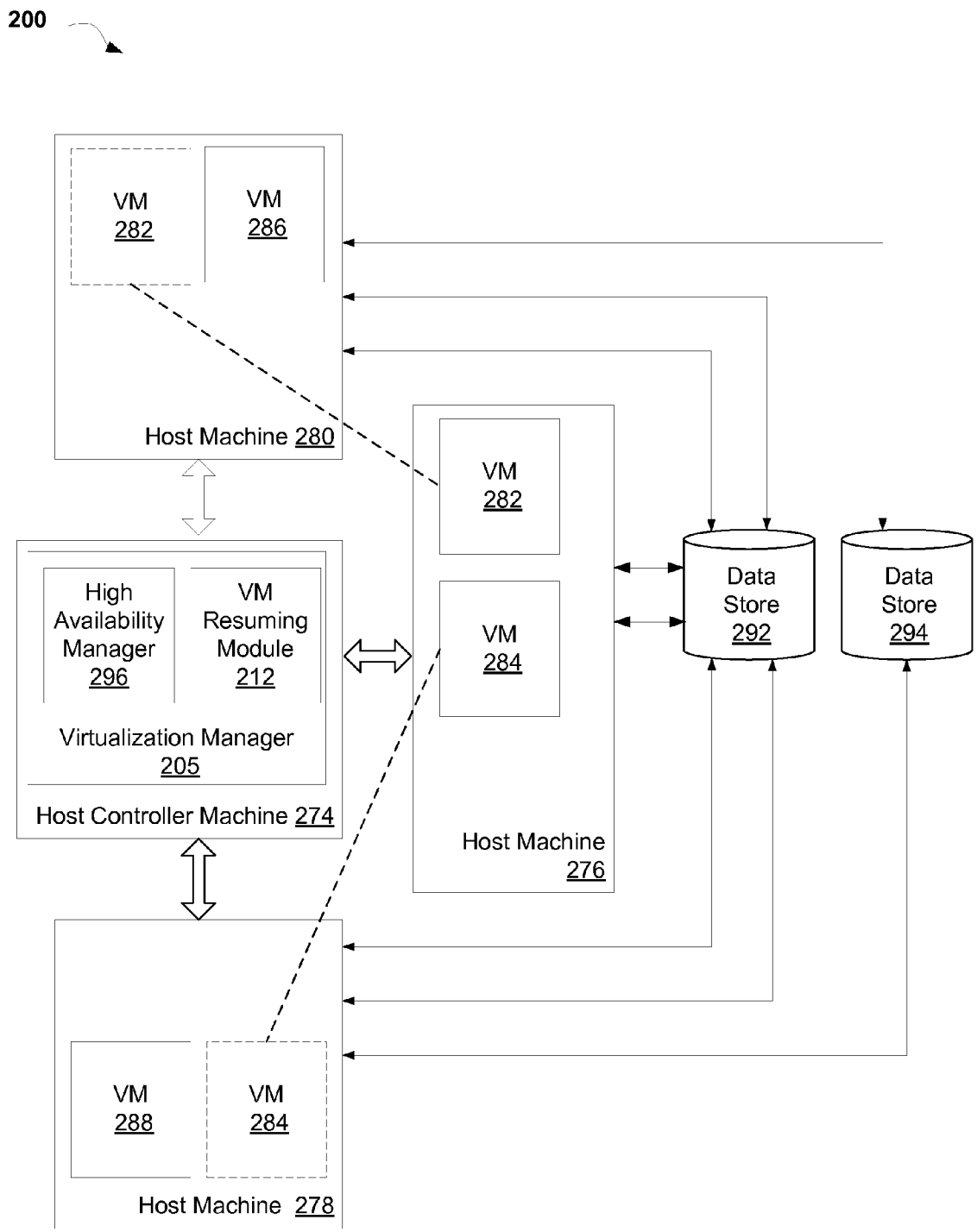
FIG. 2 illustrates a server side of a network architecture, in accordance with one embodiment of the present invention.

FIG. 2 illustrates a server side network architecture 200, in accordance with one embodiment of the present invention. The server side network architecture 200 in one embodiment is a component of network architecture 100 of FIG. 1. The server side network architecture 200 includes multiple host machines (hosts) 276, 278, 280 connected with a host controller machine (host controller) 274 and one or more data stores 292, 294.

The host controller 274 manages each of the hosts 276, 278, 280, and includes a virtualization manager 205 that manages virtual machines running on the hosts. The virtualization manager 205 may manage one or more of provisioning of new virtual machines, connection protocols between clients and virtual machines, user sessions (e.g., user authentication and verification, etc.), backup and restore, image management, virtual machine migration, load balancing, resuming virtual machines, and so on.

In one embodiment, the virtualization manager 205 includes a high availability manager 296. The high availability manager 296 may monitor virtual machines running the hosts, and load balance the hosts as necessary. For example, if multiple VMs running on a host suddenly shut down, a load imbalance may occur such that that the host is under-utilized as compared to other hosts. The high availability manager 296 may respond to the load imbalance by migrating virtual machines from hosts that are hosting many virtual machines to the host that is hosting few or no virtual machines to redistribute load. High availability manager 296 may also detect the failure of a host, and migrate the virtual machines (or other applications, processes, etc.) that had been running on the failed host to other hosts. In one embodiment, high availability manager 296 performs live migrations, in which VMs and/or other applications are migrated while they are still running.

In one embodiment, the high availability manager 296 periodically (e.g., every few seconds, every minute, etc.) or continuously polls the hosts to determine statuses of each of the hosts. Alternatively, the hosts may send reports to the host controller 274 without being polled. For example, the hosts may send reports on a periodic basis, or whenever a status of one or more virtual machines on the host changes.

Received poll responses and/or reports include a status of connectivity to one or more data stores 292, 294. For example, a report from host 280 may indicate that host 280 has lost connection to data store 294. In one embodiment, the reporting host can identify whether or not it has a connection to a particular data store 292, 294. Access may be lost, for example, if the data store has failed, if a communication link (e.g., a path) to the data store has failed, if there is a problem with a port of the host, if software or firmware included in the host has malfunctioned, or for other reasons. However, the host may not be able to identify why access to the data store has been lost.

In one embodiment, responses/reports further identify a status of paths to the data stores 292, 294. For example, data store 292 is a multi-path data store that includes two paths to host 280, host 276 and host 278. Data may be sent between each host and data store 292 via either or both of the available paths. If one of the paths becomes disabled, then communications can still be exchanged via the remaining path.

High availability manager 296 aggregates the status information regarding host access (e.g., connectivity) to data stores that is received from the hosts. The high availability manager 296 can then identify whether any of the hosts or data stores are malfunctioning based on the aggregated results. For example, if host 276 has lost access to data store 292, but host 280 and host 278 still have access to data store 292, then high availability manager 296 may identify a problem with host 276. On the other hand, if each of the hosts has lost access to data store 292, high availability manager 296 may determine that there is a problem with the data store 292. Similarly, if only host 276 has lost connection to data store 292 via a first path, but host 280 and host 278 still have access to the data store 292 via the first path, then it can be determined that the host 276 is malfunctioning. However, if both host 276 and host 278 have lost access to data store 292 via the first path, it may be determined that the data store 292 is malfunctioning or that there is a full network malfunction.

Note that not all hosts may be configured to have access to all data stores. For example, host 276 is not configured to have access to data store 294. In one embodiment, high availability manager 296 aggregates data store access of hosts that are configured to have access to a specific data store. For example, when determining whether one or more hosts or data store 294 is malfunctioning based on the connection status between the hosts and data store 294, high availability manager 296 would not consider the status of host 276 because host 276 is not configured to have access to data store 294.

In one embodiment, if high availability manager 296 determines that a host is malfunctioning, the high availability manager 296 migrates virtual machines running on that host (if any are present) to other hosts. Alternatively, or in addition, other applications, programs or processes may be migrated between hosts. In one embodiment, virtual machines (or other applications, processes, etc.) are migrated off of a host if the host has lost all access to a data store. In such an embodiment, if there is at least one available path to the data store (e.g., for a multi-path data store), no migration may occur.

To migrate a virtual machine, the high availability manager 296 saves a state of the virtual machine. The high availability manager 296 then starts a new virtual machine on a different host using the saved state. Once the new virtual machine is up and running, the high availability manager 296 may redirect a client that is using the original virtual machine to the new virtual machine. The original virtual machine can then be shut down. Migration can occur with little to no interruption to the client. Once all of the virtual machines are migrated to other hosts, a malfunctioning host may be shut down for maintenance or replacement. Other applications, processes, etc. may also be migrated between hosts in a similar manner.

In one embodiment, high availability manager 296 migrates paused virtual machines between hosts. The virtual machines on a malfunctioning host or on a host that has lost access to a data store may have been paused by the host to prevent damage to the VMs. In one embodiment, the high availability manager determines whether to migrate a paused VM based on a migration policy associated with that VM. The migration policy may indicate that stateless VMs are not to be migrated and that stateful VMs are to be migrated. Thus, in one embodiment, high availability manager 296 determines whether a paused VM is a stateless VM before migrating the paused VM. Examples of stateless VMs include VMs associated with VM pools (described below) and VMs that are web servers. If the paused VM is a stateless VM, then no data will be lost by terminating the paused VM. Therefore, rather than migrating the paused VM, a new copy of the stateless VM is started on a different host machine. If the paused VM is a stateful VM, then high availability manager 296 performs the migration. Examples of stateful VMs include unique virtual desktops (e.g., for individual users) and VMs that are database servers.

Virtualization manager 205 includes a VM resuming module 212. Once a paused VM has been migrated, VM resuming module resumes the paused VM. This may be achieved by sending a resume command to the new host machine on which the paused VM now resides. The resume command may include one or more last I/O operations attempted by the paused VM. Alternatively, the information regarding the last few I/O operations may be included in the paused VM.

In the example shown in FIG. 2, host controller 274 has determined that host 276 is malfunctioning, and both VM 282 and VM 284 are stateful VMs. Consequently, host controller 274 will migrate virtual machine 282 to host 280, and will migrate VM 284 to host 278. Note that high availability manager 296 has distributed VM 282 and VM 284 between host 280 and host 278 in a load balanced manner.

Figure 3:
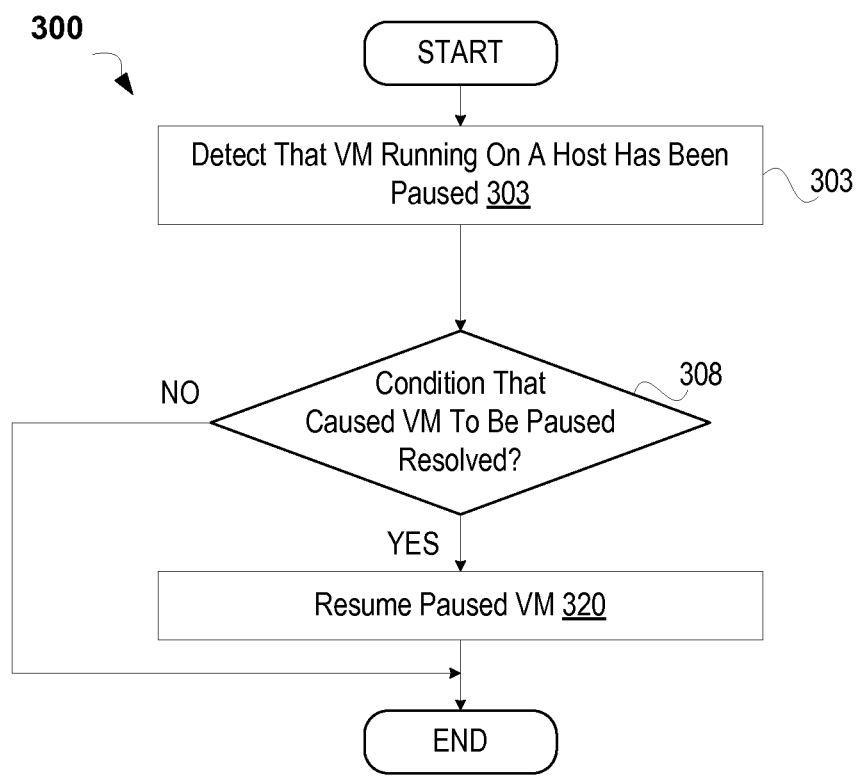
FIG. 3 is a flow diagram illustrating a method for one embodiment of automatically resuming paused virtual machines.

FIG. 3 is a flow diagram illustrating a method 300 for one embodiment of automatically resuming paused virtual machines. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by a host controller (e.g., host controller 115 of FIG. 1 or host controller 274 of FIG. 2). In a further embodiment, method 300 may be performed by a virtualization manager (e.g., virtualization manager 135 of FIG. 1) running on a host controller.

Referring to FIG. 3, at block 303 a host controller detects that a VM running on a host has been paused. The paused VM may be reported by the host when the host pauses the VM or in response to a status query from the host controller. The host may report the paused VM along with a condition that caused the VM to be paused. Alternatively, the host may report the paused VM without identifying a condition that caused the VM to be paused. In such an instance, the host controller may determine a condition that caused the VM to be paused based on information gathered from the host and from additional hosts. For example, the host may report connection status information for one or more data stores, which may be used to determine a condition that caused the VM to be paused.

At block 308, the host controller determines whether a condition that caused the VM to be paused has been resolved. If the condition that caused the VM to be paused has been resolved, the method continues to block 320. Otherwise the method ends.

At block 320, the host controller sends a command to the host to resume the paused VM. Resuming the paused VM includes assigning processor cycles to the paused VM. Additionally, resuming the paused VM may include performing a last I/O operation or operations previously attempted by the VM.

Figure 4:
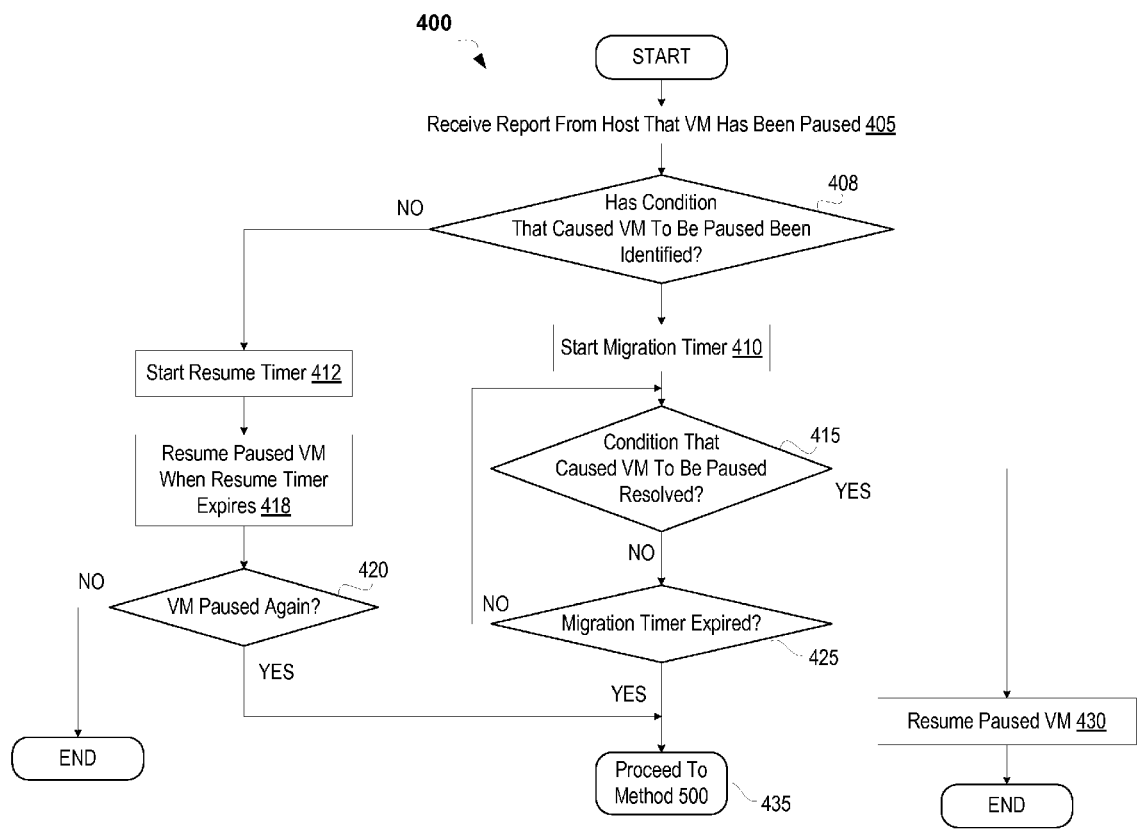
FIG. 4 is a flow diagram illustrating a method for another embodiment of automatically resuming paused virtual machines.

FIG. 4 is a flow diagram illustrating a method 400 for another embodiment of automatically resuming paused virtual machines. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by a host controller (e.g., host controller 115 of FIG. 1 or host controller 274 of FIG. 2). In a further embodiment, method 400 may be performed by a virtualization manager (e.g., a virtualization manager that includes a VM resuming module) running on a host controller.

Referring to FIG. 4, at block 405 a host controller receives a report from a host that a VM running on the host has been paused. At block 408, the host controller determines whether the condition that caused the VM to be paused has been identified. In one embodiment, the host identifies the problem that caused the VM to be paused. In another embodiment, the host reports one or more problems (e.g., loss of connection to a storage device), but does not specify whether the problems were what caused the VM to be paused. For example, the host may report that it has lost access to a data store (e.g., can no longer communicate with the data store). The host may lack access to only a single storage device, or may lack access to an entire storage domain. For multi-path data stores, access is lost when the host cannot communicate with the data store via any of the paths.

In some instances, the VM may have been paused without knowing what problem or condition caused the VM to be paused. In some instances, no problems may be detected. If the condition that caused the VM to be suspended was identified, the method continues to block 410. If the condition that caused the VM to be paused was not identified, the method continues to block 412.

At block 412, the host controller starts a resume timer. At block 418, the host controller resumes the paused virtual machine once the resume timer expires (times out). The VM is resumed automatically without requiring any user input. At block 420, the host controller then determines whether the VM was again paused by the host. If the VM was not paused again, it can be determined that the unknown condition that previously caused the VM to be paused has been resolved. In this instance, the method ends. If the VM was paused again, it can be deduced that the condition that previously caused the VM to be paused has not yet been resolved. In this instance the method proceeds to block 435, and method 500 is initiated. In one embodiment, the process of starting the resume timer and resuming the VM when the resume timer expires is performed a predetermined number of times before continuing to block 435.

At block 410, the host controller starts a migration timer. At block 425, the host controller determines whether the condition that caused the VM to be paused has been resolved. This may be determined by polling the host and/or other hosts to determine, for example, the host's storage connection status. If the condition has been resolved, the method proceeds to block 430, and the paused VM is resumed. The paused VM is resumed automatically, without user input. If the condition has not been resolved, the method continues to block 425.

At block 425, the host controller determines whether the migration timer has expired (timed out). If the migration timer has not expired, the method returns to block 415. if the migration timer has expired, the method proceeds to block 435, and method 500 is initiated.

Figure 5:
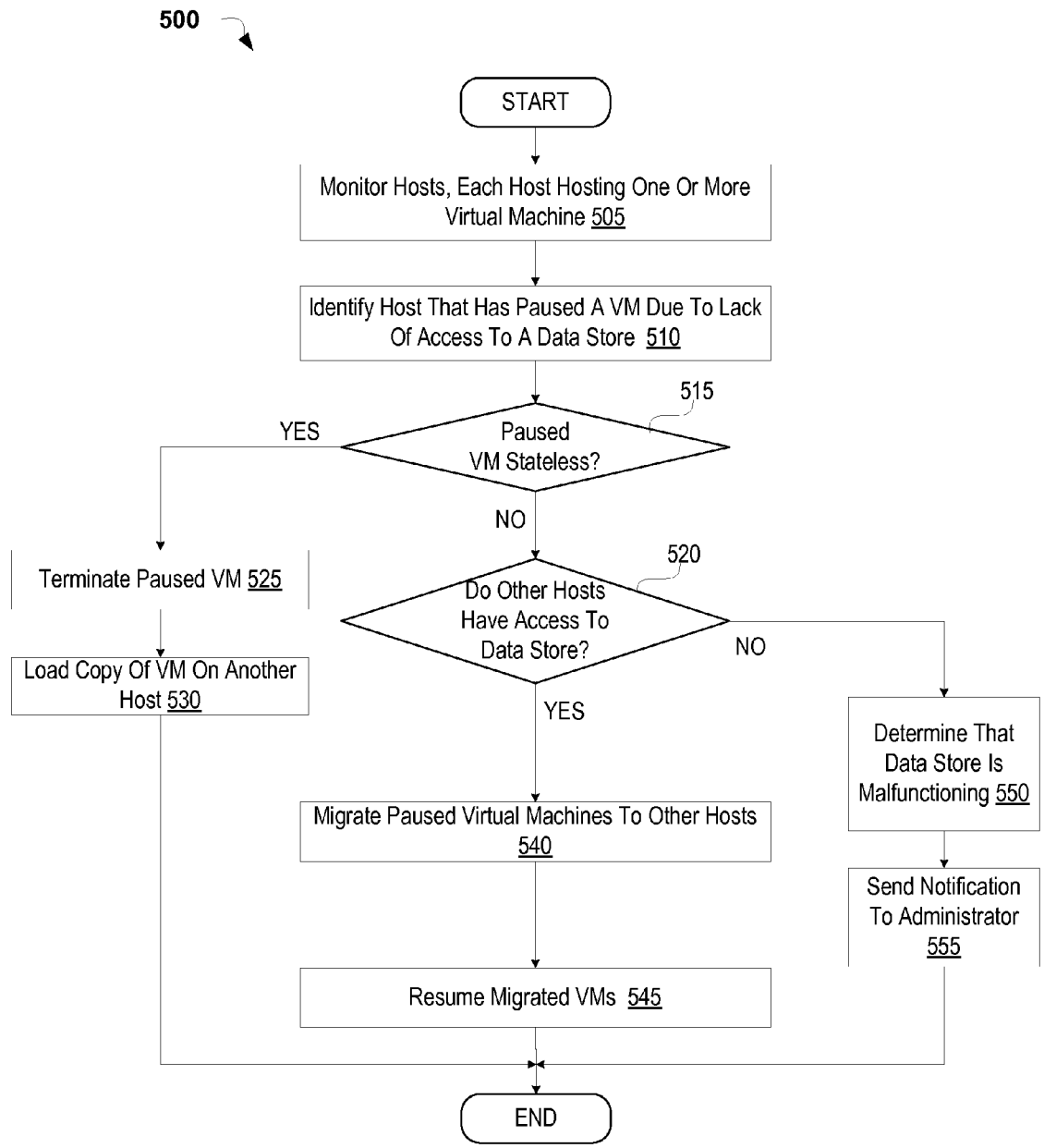
FIG. 5 is a flow diagram illustrating a method for one embodiment of migrating paused virtual machines.

FIG. 5 is a flow diagram illustrating a method for one embodiment of migrating paused virtual machines. Method 500 may be performed by processing logic that may comprise hardware (e.g., circuitry, dedicated logic, programmable logic, microcode, etc.), software (such as instructions run on a processing device), or a combination thereof. In one embodiment, method 500 is performed by a host controller (e.g., host controller 115 of FIG. 1 or host controller 274 of FIG. 2). In another embodiment, method 500 is performed by a virtualization manager of a host controller.

Referring to FIG. 5, at block 505 a host controller monitors one or more hosts. Each of the monitored hosts may include one or more virtual machines operating thereon. The monitored hosts may also include other applications, processes, services, etc. operating thereon. The hosts may be connected to a data store on which the VMs write data and from which the VMs read data.

At block 510, the host controller identifies a host that has paused a VM due to lack of access to a data store. At block 515, the host controller determines whether the paused VM is a stateless VM. A stateless VM is a virtual machine that will not keep any changes that are made to the VM. After a session with a stateless virtual machine has ended, all changes that were made to the stateless VM are lost. A stateless VM may be a VM from a VM pool (a pool of identical virtual machines, each of which may be based on a single VM template), a VM that operates as a web server, etc.

If the VM is a stateless VM, there is no need to migrate the VM to another host. Instead, the method proceeds to block 525, and the VM is terminated. A copy of the VM is then loaded on another host. For example, another VM from a VM pool may be loaded on the other host.

If at block 515 it is determined that the VM is a stateful VM (a VM for which changes are recorded), the method proceeds to block 520. At block 520, the host controller determines whether any other hosts have access to the data store. If another host has access to the data store, then the VM can be migrated. Thus, the method continues to block 540. If no other hosts have access to the data store, then migrating the VM to another host would not enable the VM to be resumed. Thus, the method continues to block 550.

At block 540, the host controller migrates the paused virtual machine to another host that has access to the data store. At block 545, the host controller causes the VM to be resumed.

At block 550, the host controller determines that the data store and/or network are malfunctioning. The host controller may then send a notification to an administrator indicating that the data store is malfunctioning.

Figure 6:
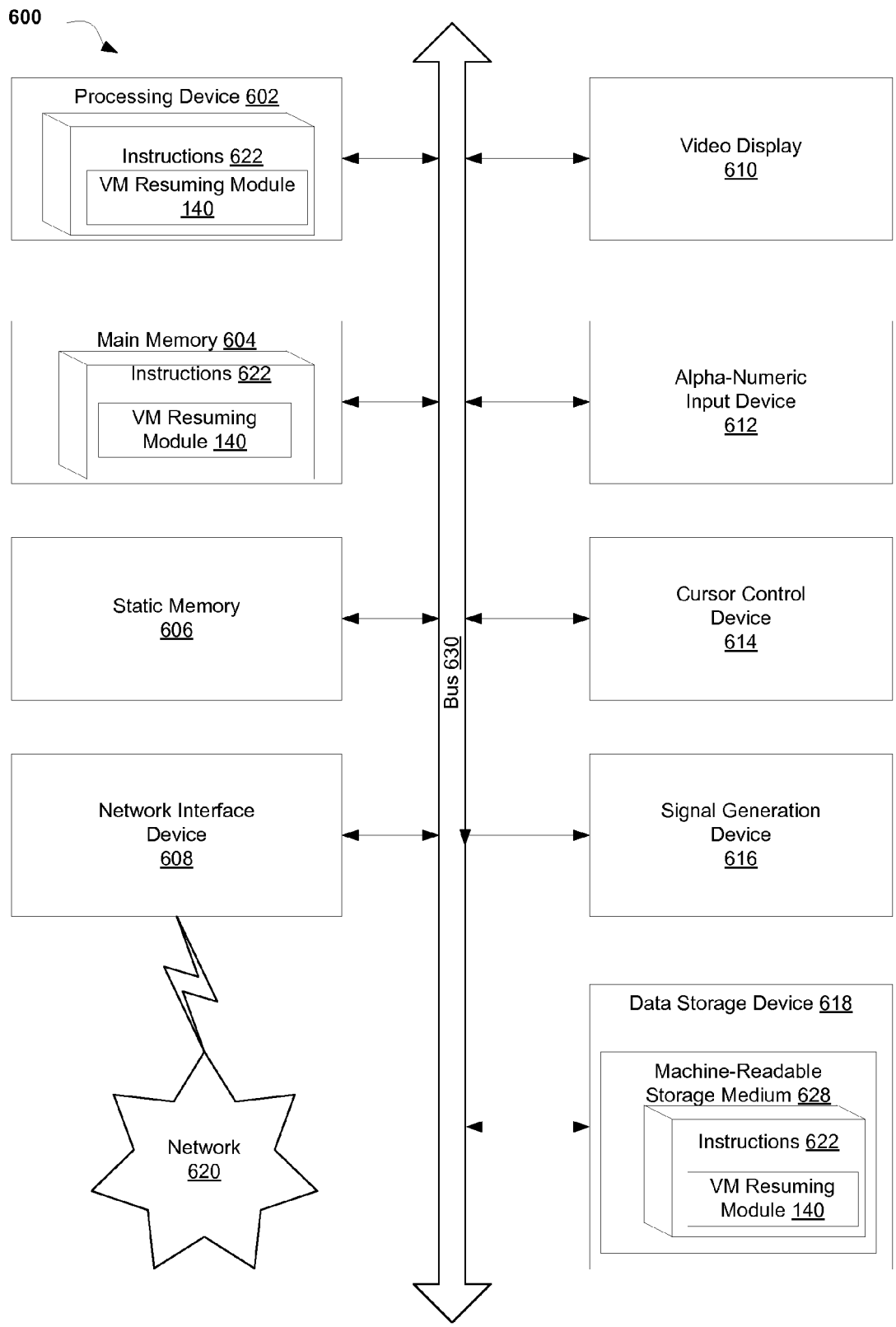
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic (e.g., instructions 622) for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media.

The machine-readable storage medium 628 may also be used to store instructions for a virtualization manager having a VM resuming module (e.g., VM resuming module 140 of FIG. 1), and/or a software library containing methods that call the virtualization manager and/or the VM resuming module. While the machine-readable storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
    detecting, by a processing device, that a virtual machine has been paused;
    determining that a condition that caused the virtual machine to be paused has been resolved;
    transmitting a command to resume the virtual machine without restarting the virtual machine; and
    causing the virtual machine to perform an input/output (I/O) operation that was attempted prior to the virtual machine being paused.

2. The method of claim 1, wherein the condition that caused the virtual machine to be paused comprises a loss of access to a data store.

3. The method of claim 2, further comprising:
    migrating the virtual machine to a remote host and
    resuming the virtual machine after the migrating.

4. The method of claim 3, wherein the remote host and a computer system comprising the processing device belong to a cluster.

5. The method of claim 1, further comprising:
    starting a timer upon detecting that the virtual machine has been paused;
    wherein the command to resume the virtual machine is transmitted responsive to detecting expiration of a timeout measured by the timer.

6. The method of claim 1, further comprising:
    determining that the virtual machine is a stateless virtual machine that belongs to a virtual machine pool;
    transmitting a command to a first remote host to terminate the virtual machine; and
    loading a copy of the virtual machine from the virtual machine pool on a second remote host.

7. A non-transitory computer readable storage medium including instructions that, when executed by a processing device, cause the processing device to:
    detect, by the processing device, that a virtual machine has been paused;
    determine that a condition that caused the virtual machine to be paused has been resolved;
    transmit a command to resume the virtual machine without restarting the virtual machine; and
    cause the virtual machine to perform an input/output (I/O) operation that was attempted prior to the virtual machine being paused.

8. The non-transitory computer readable storage medium of claim 7, wherein the condition that caused the virtual machine to be paused comprises a loss of access to a data store.

9. The non-transitory computer readable storage medium of claim 8, the processing device further to:
    migrate the virtual machine to a remote host and
    resume the virtual machine after the migrating.

10. The non-transitory computer readable storage medium of claim 7, wherein the processing device further to:
    start a timer upon detecting that the virtual machine has been paused;
    wherein the command to resume the virtual machine is transmitted responsive to detecting expiration of a timeout measured by the timer.

11. The non-transitory computer readable storage medium of claim 7, the processing device further to:
   determine that the virtual machine is a stateless virtual machine that belongs to a virtual machine pool;
   transmit a command to a first remote host to terminate the virtual machine; and
   load a copy of the virtual machine from the virtual machine pool on a second remote host.

12. The non-transitory computer readable storage medium of claim 7,
   wherein while paused the virtual machine is not assigned any processor cycles.

13. A computing apparatus, comprising:
   a network interface device; and
   a processing device, coupled to the network interface device, to:
      detect that a virtual machine has been paused;
      determine that a condition that caused the virtual machine to be paused has been resolved;
      transmit a command to resume the virtual machine without restarting the virtual machine; and
      cause the virtual machine to perform an input/output (I/O) operation that was attempted prior to the virtual machine being paused.

14. The computing apparatus of claim 13, wherein the condition that caused the virtual machine to be paused is comprises a loss of access to a data store.

15. The computing apparatus of claim 14, wherein the processing device is further to:
   migrate the virtual machine to a remote host and
   resume the virtual machine after the migration.

16. The computing apparatus of claim 13, wherein the processing device is further to:
   starting a timer upon detecting that the virtual machine has been paused;
   wherein the command to resume the virtual machine is transmitted responsive to detecting expiration of a timeout measured by the timer.

17. The computing apparatus of claim 13, wherein the processing device is further to:
   determine that the virtual machine is a stateless virtual machine that belongs to a virtual machine pool;
   transmit a command to a first remote host to terminate the virtual machine; and
   load a copy of the virtual machine from the virtual machine pool on a second remote host.

18. The computing apparatus of claim 13,
   wherein while paused the virtual machine is not assigned any processor cycles.

\* \* \* \* \*